United States Patent
Kirkby et al.

(10) Patent No.: US 10,073,919 B2
(45) Date of Patent: Sep. 11, 2018

(54) SYSTEM AND METHOD OF SEARCH VALIDATION

(75) Inventors: Stephen Denis Kirkby, Unley (AU); Peter Kellett, Kilburn (AU)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 842 days.

(21) Appl. No.: 12/296,208

(22) PCT Filed: Apr. 10, 2008

(86) PCT No.: PCT/AU2008/000501
§ 371 (c)(1),
(2), (4) Date: Dec. 7, 2010

(87) PCT Pub. No.: WO2008/122091
PCT Pub. Date: Oct. 16, 2008

(65) Prior Publication Data
US 2011/0072002 A1    Mar. 24, 2011

(30) Foreign Application Priority Data
Apr. 10, 2007   (AU) ................................. 2007901883

(51) Int. Cl.
*G06F 17/30* (2006.01)

(52) U.S. Cl.
CPC .... *G06F 17/3089* (2013.01); *G06F 17/30864* (2013.01)

(58) Field of Classification Search
USPC ...................................................... 707/711
See application file for complete search history.

(56) References Cited

U.S. PATENT DOCUMENTS

| | | | |
|---|---|---|---|
| 7,225,197 B2 * | 5/2007 | Lissar | G06F 17/30604 707/700 |
| 2002/0022955 A1 * | 2/2002 | Troyanova | G06F 17/271 704/9 |
| 2002/0099697 A1 | 7/2002 | Jensen-Gray | |
| 2003/0061028 A1 * | 3/2003 | Dey | G06F 17/30017 704/9 |
| 2004/0103090 A1 * | 5/2004 | Dogl et al. | 707/3 |
| 2005/0055342 A1 | 3/2005 | Bharat et al. | |

(Continued)

FOREIGN PATENT DOCUMENTS

| CN | 1818908 | 8/2006 |
|---|---|---|
| JP | 2005276213 | 10/2005 |

(Continued)

OTHER PUBLICATIONS

Can et al.; "Automatic Performance evaluation of Web search engines"; Apr. 29, 2003; Department of Computer Engineering, Bilkent University, Turkey.*

(Continued)

*Primary Examiner* — Ashish Thomas
*Assistant Examiner* — Mellissa M. Ohba
(74) *Attorney, Agent, or Firm* — Mannava & Kang, P.C.

(57) ABSTRACT

A method of validating results of a host search engine (50), the method including the steps of scanning all data objects deliverable via a web interface with a scanning engine (25) and executing a matching engine (35) to generate a report set containing content missed by the host search engine (50).

15 Claims, 8 Drawing Sheets

(56) References Cited

U.S. PATENT DOCUMENTS

2005/0071766 A1    3/2005  Brill et al.
2007/0265999 A1*  11/2007  Amitay et al. .................... 707/2
2009/0292677 A1*  11/2009  Kim .................... G06F 17/3089

FOREIGN PATENT DOCUMENTS

| JP | 2006011851 | 1/2006 |
| JP | 2006301975 | 11/2006 |
| WO | WO 2008/014262 | 1/2008 |

OTHER PUBLICATIONS

Search Engine Coverage Tool:XP002636008. web.archive.org, 2006.
Morimura et al., "An Integrated Method between WWW Search Engines", Information Processing Society of Japan, NII—Electronic Library Service, Jul. 17, 2001, 7 pages.
Tsukuda et al., "Study on Automatic Extraction of Field Association Word by Using Web Search Engine", Mar. 13, 2006, 4 pages.
Anonymous, "Internet Archive WaybackMachine coverage of http://www.searchenginecoverage.co.uk in 2006 and 2007", [Online] Mar. 22, 2012, pp. 1-2, Retrieved from the Internet on Mar. 22, 2012.
Anonymous, "Search Engine Coverage Tool", May 2, 2006, pp. 1-2, Retrieved from the Internet on Mar. 22, 2012.
Anonymous, "Custom Search Engine FAQ", Feb. 2, 2007, pp. 1-3, Retrieved from the Internet on Mar. 23, 2012.
Anonymous, "Standalone Sitemap Generator Documentation", Dec. 16, 2006, pp. 1-4, Retrieved from the Internet on Aug. 21, 2014.
Anonymous, "Creating Sitemaps for Google, MSN and Yahoo!—The Easy Way", Dec. 16, 2006, pp. 1-2, Retrieved from the Internet on Aug. 21, 2014.
Japan Patent Office, English translation of "Official Notice of Rejection" on Japanese Patent Application No. 2010-502390, dated Nov. 9, 2012, 6 pages.
"The Communication", European Patent Application No. 08714483.8, European Patent Office, dated Mar. 29, 2012, 7 pages.
"The Communication", European Patent Application No. 08714483.8, European Patent Office, dated Feb. 19, 2013, 8 pages.
PCT ISR, Apr. 10, 2008.

* cited by examiner

Pages and Documents with Keywords matching Targeted Keywords

This section lists pages and documents not found in the General Search Engine Coverage Report with meta keywords that match the targeted keywords.
No pages or documents with meta keywords matching targeted keywords.

Pages and Documents with Meta Description matching Targeted Keywords

This section lists pages and documents not found in the General Search Engine Coverage Report with meta descriptions that match the targeted keywords.
No pages or documents with meta description matching targeted keywords.

Pages with H1 matching Targeted Keywords

This section lists pages not found in the General Search Engine Coverage Report with H1 headers that match the targeted keywords.
No pages with H1 headers matching targeted keywords.

Pages with H2 matching Targeted Keywords

This section lists pages not found in the General Search Engine Coverage Report with H2 headers that match the targeted keywords.
No pages with H2 headers matching targeted keywords.

Pages and Documents with First Paragraph matching Targeted Keywords

This section lists pages and documents not found in the General Search Engine Coverage Report with a first paragraph that matches the targeted keywords. A paragraph as the spider sees it is defined as 100 words or 15% (whichever is smallest) of static non-H1/H2 text. A paragraph may contain text links. The first paragraph is the first 100 words (or 15% of all words on the page) after the </BODY>tag
No pages or documents with first paragraph matching targeted keywords.

Pages and Documents with Last Paragraph matching Targeted Keywords

This section lists pages and documents not found in the General Search Engine Coverage Report with a last paragraph that matches the targeted keywords. A paragraph as the spider sees it is defined as 100 words or 15% (whichever is smallest) of static non-H1/H2 text. A paragraph may contain text links. The last paragraph is the first 100 words (or 15% of all words on the page) before the </BODY>tag.
No pages or documents with last paragraph matching targeted keywords.

Pages and Documents with Body matching Targeted Keywords

This section lists pages and documents not found in the General Search Engine Coverage Report with body that matches targeted keywords. The body text is defined as any static non-H1/H2 text (including text links) between the first and last paragraphs.
No pages or documents with body matching targeted keywords.

*FIG. 6b*

SYSTEM AND METHOD OF SEARCH VALIDATION

FIELD OF THE INVENTION

The present invention relates to a system and method of search validation for web based systems.

BACKGROUND OF THE INVENTION

Most web-sites include a search engine facility in order to allow visitors to that site to execute searches in an attempt to locate items of interest. As web-sites have increasingly become the preferred means of communicating with clients, the owners of web-sites are particularly interested in ensuring that their web-site is user friendly and provides their clients with a positive experience.

Clients who are frustrated as a result of an experience with a web-site may develop a negative view of the entity that owns the site and in instances where the web-site provides the mechanism for a client to conduct transactions, such as locating and purchasing items for sale, the client may discontinue purchasing items due to the inability to quickly locate and purchase the desired item. Even for sites that only act to provide information to clients, such as web-sites for government departments, it is still important to the owner of the site to ensure that clients can locate the information that they require otherwise a negative impression will manifest itself in dissatisfaction with the entity that owns and/or operates the web-site.

A problem with web sites is that the effectiveness of the search engine cannot be tested. All search engine testing done to date is done manually via the browser and as a result, organisations become aware of problems with their search engine "after the fact".

This usually occurs as a result of client feedback where a client has attempted to locate an item of information on a web-site and reports to the organisation their inability to locate that information. Of course, relying upon this approach to locate problems associated with missed content by the web-site search engine results in a negative perception in the mind of clients and does not provide a means to finding a solution. Further, after becoming aware of the missed content, it is necessary for the organisation to manually investigate and resolve the problem with the web-site search engine.

Currently, there is no automated way of executing search engine validation to ensure that the search engine provides full coverage of the information contained within a web-site (or set of linked web-sites). Further, there is no means by which one can check the coverage executed by a search engine. As indicated, the current solution is after the fact when client feedback is delivered to the search team (eg why couldn't I find document "a"?). The search engine is relied upon to deliver the results without any in depth understanding as to how the search engine indexed all of the web-site content. This is because the search engine can only validate what has been indexed and not what has been missed. Accordingly, the staff who work in search engine teams have no pro-active means by which to validate the coverage of their search engine.

The reference to any prior art in this specification should not be taken as an acknowledgment, or any form or suggestion that the prior art forms part of the common general knowledge at the priority date of the claims herein.

SUMMARY OF THE INVENTION

In one aspect, the present invention provides a method of validating results of a host search engine, said method including the steps of scanning all data objects deliverable via a web interface and executing a matching engine to generate a report set containing content missed by said host search engine.

The report set may include an inventory report detailing the exact locations of the content within the web interface. Further reports may include a "page with most-in links" within a web site report to assist the search engine operators with the tuning of their search engine.

The report set may also include a web URL inventory highlighting the differing web domains owned by the web interface system.

In an embodiment of the invention, the step of scanning all data objects deliverable by a web interface includes the development of an index of all the objects for future reference. In one embodiment, an index of all the available words in the web-site is formed. Further, the index of all available words may be ordered according to the uniqueness of the words. For example, density analyses may be employed in order to determine the relative uniqueness of words located during a scan.

In alternative embodiments, all objects such as pages, images, text, links, meta data and scripts along with documents and properties of PDF, Word, Power Point and other output formats are captured and indexed.

In the embodiment that scans and obtains all the available words in a web-site, having established the unique words, these may then be used as key words when executing the matching engine. In this embodiment, the key words are entered into the relevant fields in the search engine to determine whether all instances of the key word can be located by the search engine. Having entered the key words into the search engine fields, the resulting set of URL's that are located by the search engine may then be compared to the set of URL's identified by the scan. Any difference between the set of URL's identified by a scan for a key word and the result of the search engine's attempt to locate all instance of the same key word represents missed content.

In an embodiment of the invention, the report set includes the URL's in which the missed content resides.

In another aspect, the present invention provides a system for validating results of a host search engine including:
  a host search engine operable to execute searches of a web-site;
  a scanning component that scans and locates all the data objects available via the web interface to the web-site; and
  a matching engine operable to receive the data objects located by the scanning component and submitting same to the host search engine to determine those data objects obtained from the scanning component that cannot be located by the host search engine thereby representing data objects missed by the host search engine.

In yet another aspect, the present invention provides computer instruction code operable to control the operation of a computer to validate the results of a host search engine, the computer instruction code effecting the steps of:
  scanning all data objects deliverable via a web interface; and
  executing a matching engine to generate a report set containing content missed by the host search engine.

In another aspect, the present invention provides a computer program embodied on a computer readable medium for validating the results of a host search engine, the computer program including:

computer instruction code for scanning all data objects deliverable via a web interface;

computer instruction code for executing a matching engine to generate a report set identifying content missed by the host search engine.

Accordingly, a system and method according to the present invention validates the "coverage effectiveness" of an enterprise web-site search engine. The system and method advises where the web-site search engine has not indexed or missed content thus improving user productivity by facilitating better search results.

The techniques described herein may be embodied by stored, executable instructions that are executed by one or more suitable processing devices such as personal or server computers.

BRIEF DESCRIPTION OF THE DRAWINGS

The present invention will now be described with reference to the accompanying drawings, which illustrate exemplary embodiments of the present invention, wherein:

FIGS. 6a and 6b form a report of the results of a targeted search engine coverage validation procedure.

DETAILED DESCRIPTION OF EMBODIMENT(S) OF THE INVENTION

An embodiment of the present invention resides in executable computer software capable of installation on in-house computer equipment operating a range of operating system software (eg Windows, Linux & Solaris) or executed as an ASP service. The software scans all data objects available via a web interface to an end user. After completing the scan, the software executes an analytical matching engine that generates a report set that details areas where the host search engine has missed content that the scanning software identified.

In an embodiment, the report set is html based and identifies the physical areas where the scan of all available data objects and the enterprise web-site search results differ. Of course, various reports may be generated for the purposes of identifying missed data and resolving the problem with the enterprise search engine to include that missed data. For example, an inventory report detailing the exact locations of the content within the organization may be generated. Another report detailing the "page with most-in links" (i.e. the page with the most inwardly directed links to that page) within a web site assists the search engine users with the tuning of their search engine. In this regard, tuning a search engine using linked pages is a common enterprise technique. Yet another report that identifies a web URL inventory can be useful in highlighting to the host enterprise search team the differing web domains that they own.

The recipient of the reports may then use the results to improve the coverage of their existing web-site search engine. For example, visiting the pages that are not being indexed by an existing web-site search engine and reviewing the page code may allow an operator to understand whether the page code is the cause of the underlying data in the page being missed. In this regard, errors in javascript and/or flash navigation have been known to cause entire portions of web-sites to not be indexed.

The reports assist operators to resolve any problems with their web-site search engine to ensure complete coverage. This process may be effected by an iterative process whereby an operator uses the software that effects the method of the present invention to validate their existing enterprise search solution offering.

Figure 1:
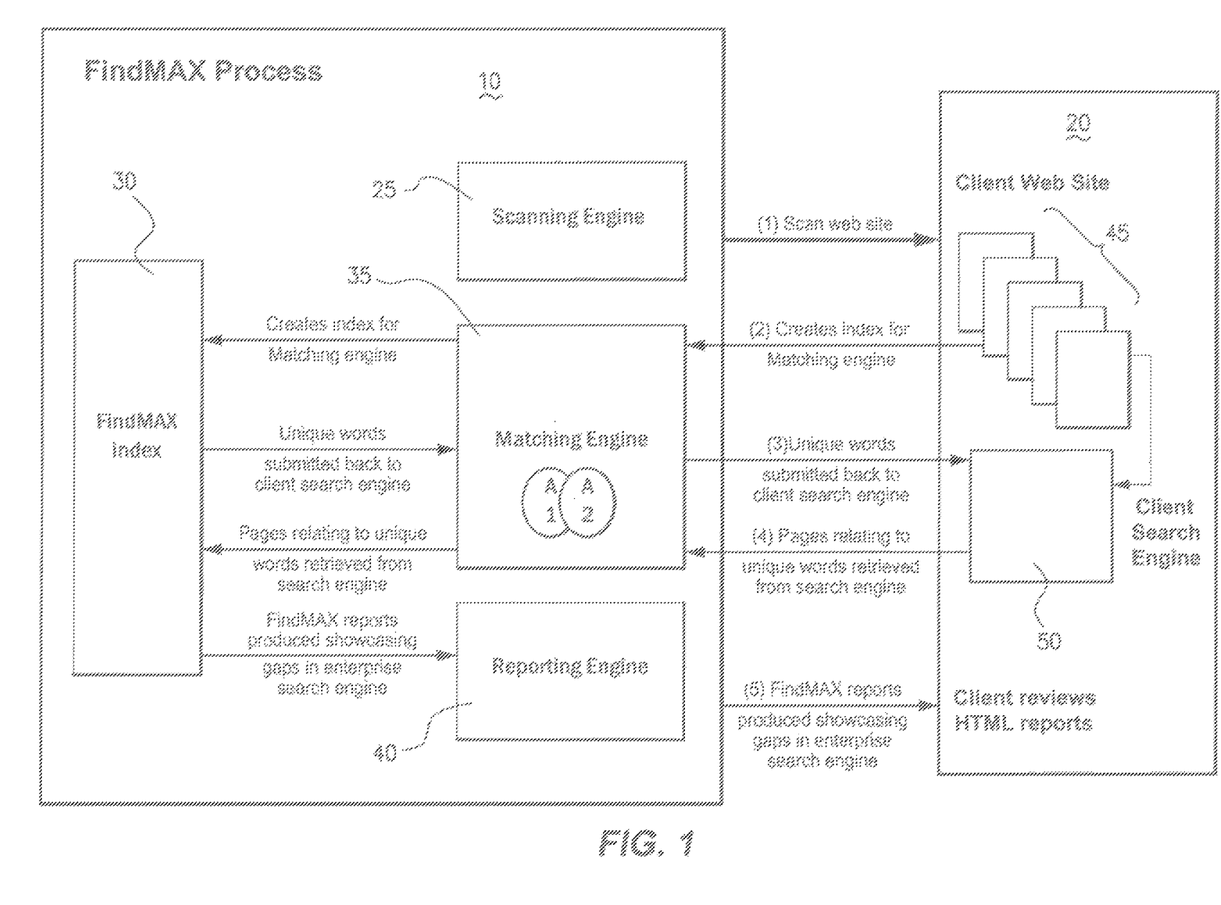
FIG. 1 is a diagrammatic representation of the validation of a web-site search engine.

With reference to FIG. 1, a search validation process (referred to herein as the FindMax process) is represented in a diagrammatic form that details the relative location at which various aspects of the validation method are performed.

For example, the FindMax process components (10) are executed on a separate computer (or computers) from the computer (or computers) that host the Client Web Site (20). The primary FindMax Process (10) components comprise a scanning engine (25), a FindMax index (30), a matching engine (35) and a reporting engine (40).

Similarly, the Client Web Site (20) comprises a range of web pages (45) and a Client Search Engine (50).

In the embodiment detailed in FIG. 1, there are five primary method steps (with corresponding data communication) between the FindMax Process components (10) and the Client Web Site (20). At step (1), the scanning engine (25) scans the web pages (45) of the Client Web Site (20). At step (2), the located data objects resulting from the scan are indexed for use by the matching engine (35). In this regard, the FindMax index (30) is created and the unique words (as determined by an analysis of the index) are passed back to the Client Search Engine (50).

At step (3), the unique words are submitted back to the Client Search Engine (50) by inserting those words into the search field of the Client Search Engine (50). The Client Search Engine (50) locates web pages relating to the unique words and at step (4) al, the pages relating to the unique words are passed to the matching engine (35). The matching engine (35) then compares the pages from the Client Search Engine (50) with those pages recorded in the FindMax index (30) for the same unique words to determine any instance of pages in the FindMax index (30) that were not located by the Client Search Engine (50) for the same unique word.

At step (5), the reporting engine (40) generates a report of the inconsistencies between the pages recorded in the FindMax index (30) as compared with the pages retrieved from the Client Search Engine (50), the report representing instances of missed data by the Client Search Engine (50). The report at step (5) is passed to the client for subsequent analysis by operators responsible for the operation of the Client Search Engine in order to enable them to investigate the reasons for the search engine missing data and taking the necessary corrective action.

Figure 2:
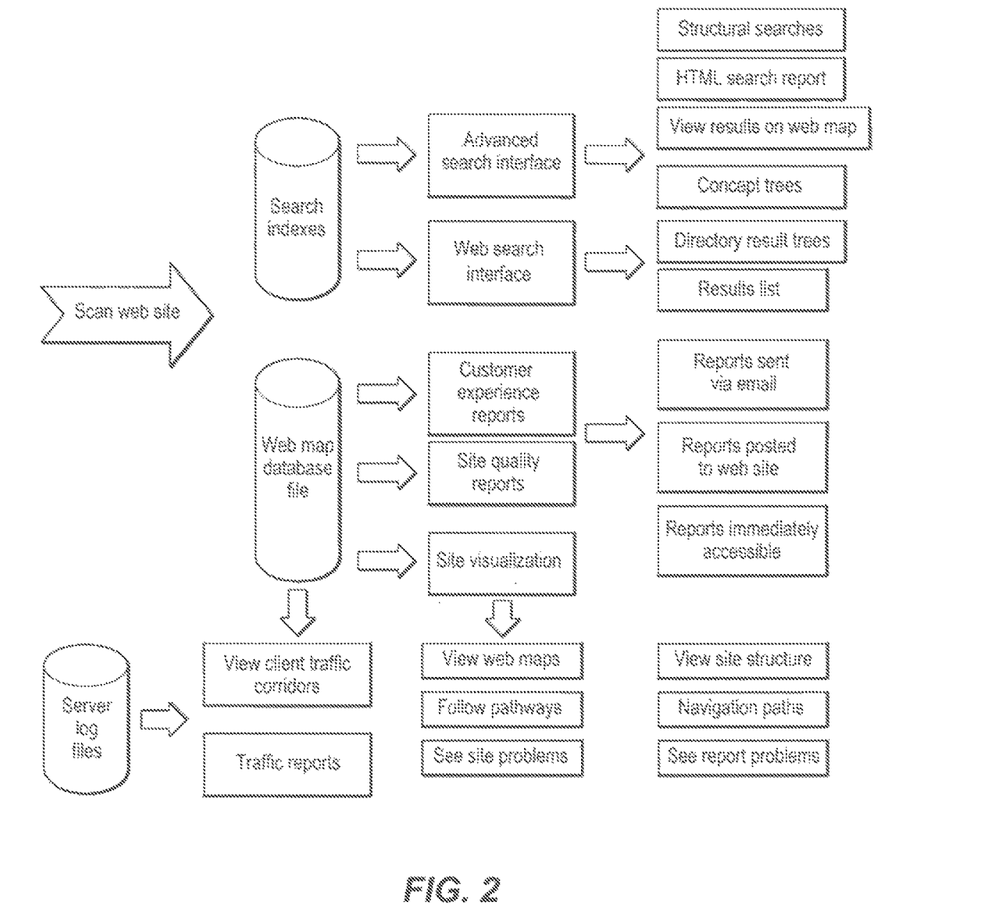
FIG. 2 is a diagrammatic representation of the databases and types of information that are typically utilised when conducting an analysis of a web-site.

Of course, it is possible to generate a range of reports to assist search engine operators to understand the deficiencies of their search engine and to assist them in correcting those deficiencies. The system and method of the present invention is directed primarily to the issue of search coverage which is one member of a suite of metrics that may be used to improve the usability of a web-site. In this regard, with reference to FIG. 2, an alternative diagrammatic representation depicting primary components of the system is provided wherein different types of reports are identified such as customer experience reports and site quality reports.

In any event, a fundamental aspect of assessing the usability of a web-site is the coverage of the search engine. Even if the visual presentation of a web site page to a user is superior to other web-sites, a high level of dissatisfaction will arise if the search engine does not locate the information that is sought by the user.

In an embodiment, the scanning engine has the capacity to scan and analyse every type of web object being delivered to the user through the browser. It is common for web content to consist of html, flash, AJAX, java scripts and documents of varying formats such as those with a filename extension of .doc, ppt, .xls. Thus in this embodiment, the scanning engine needs to be robust, flexible and able to interpret all the different file types being served. This can be a very complicated process as many search engines are unable to scan these different data types.

In another embodiment, parallel processing techniques are implemented in order to "accelerate" the capacity of the FindMax process to scan web content (i.e. the FindMax process can execute multiple processes with respect to the scanning of the one web site in order to decrease the amount of time required to complete a scan of the web-site).

In another embodiment, learning techniques to assist with the scanning process are incorporated in the FindMax process. In this arrangement, there is a particular focus on the scanning of duplicate content and re-directs within web sites. As an example, if the scanning process detects re-directs or duplicate content being delivered out of the web server, the scanner should automatically stop retrieving the re-directs and continue to focus on more relevant content. The same concept is applicable to duplicate content and in this regard, the scanner should detect patterns in the content and learn to not retrieve duplicate content as part of the retrieval process. Accordingly, in this embodiment, the scanning engine makes "intelligent real-time decisions" as it scans a web asset.

In one particular embodiment, the FindMax process indexes all of the content as its being scanned. A simplistic approach to indexing located words is on the basis of frequency of occurrence of a search string. In one embodiment, in addition to considering frequency, the indexing process also evaluates the relative importance of context, proximity to other topics and other important measures. In this regard, intelligent knowledge-mining algorithms may be used to understand what concepts are related to a given search string and to automatically expand the query to include related concepts.

In embodiments that use advanced learning techniques as the FindMax process scans information repositories it learns about the principles of information categorization, representing the structure of the repositories as a set of category trees. This feature ensures that the FindMax process captures the unique patterns of categorizing and storing information in an organization, rather than relying on assumptions that may not apply.

The resulting category trees may then used as in a knowledge query results visualization tool. They are also available for users to browse independently. This visualisation tool helps users to understand the information hierarchy within the organization which can then be used for optimizing their future searches.

As previously described, once a scan is completed, the FindMax process will take the output of its own index (as described above) from its internal search engine and cross-match it to the output of the "host enterprise search solution". This process will be executed using a matching engine. In one embodiment, this matching engine is designed such that the FindMax process finds unique "low count" words within web pages from its own index and then submits these unique words back into the "host enterprise search solution". The retrieved results (being URL's) from the host enterprise search solution are then matched to the FindMax process output. URL's or web pages that are located by the FindMax process and not the host enterprise search engine are then detailed on an html report.

Figure 3:
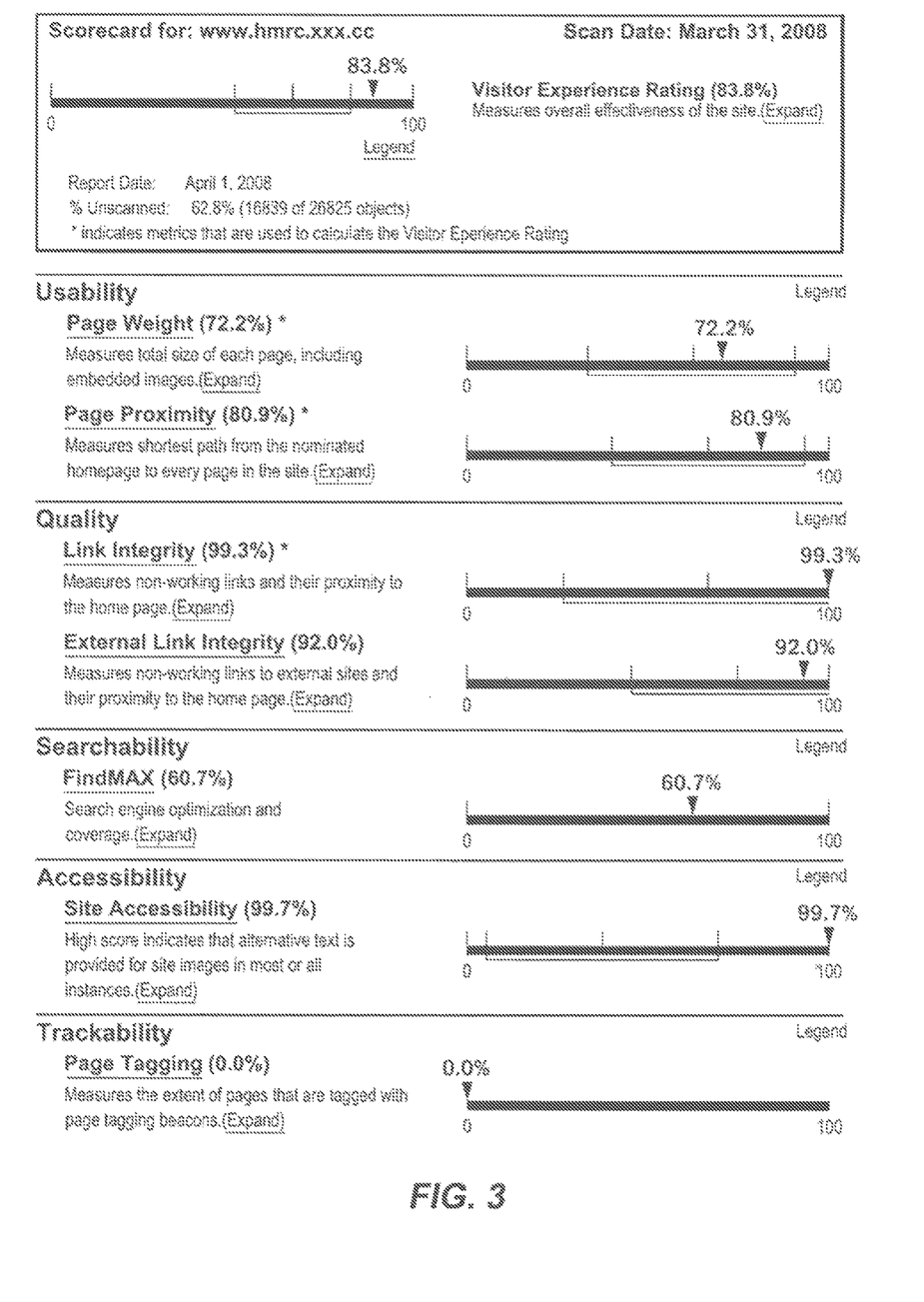
FIG. 3 is a report detailing the results of an investigation of the experience of a visitor to a web-site including a reported rating for the searchability of the web-site.

With reference to FIG. 3, an example report of an assessment of a web-site is provided. The report provides separate ratings for usability, quality, searchability, Accessability and Trackability. Each of these measures are standard measures that are regularly used to determine the effectiveness (and hence user friendliness) of a web-site. Of the measures identified in the report of FIG. 3, the Searchability aspect is the measure relevant to the effectiveness of search engine coverage.

Figure 4A:
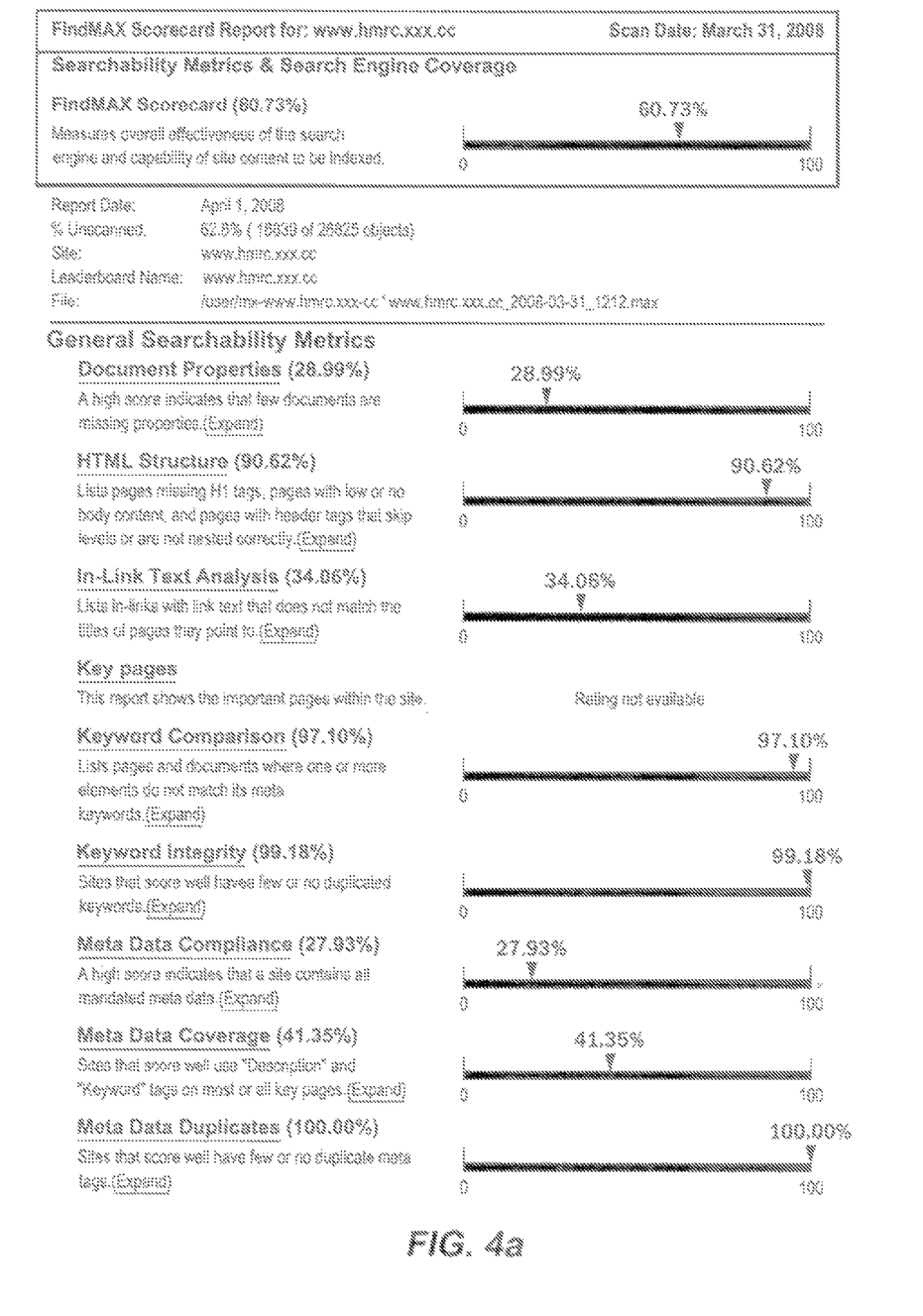
FIGS. 4a and 4b form a report of the searchability metrics and search engine coverage for a web-site.
Figure 4B:
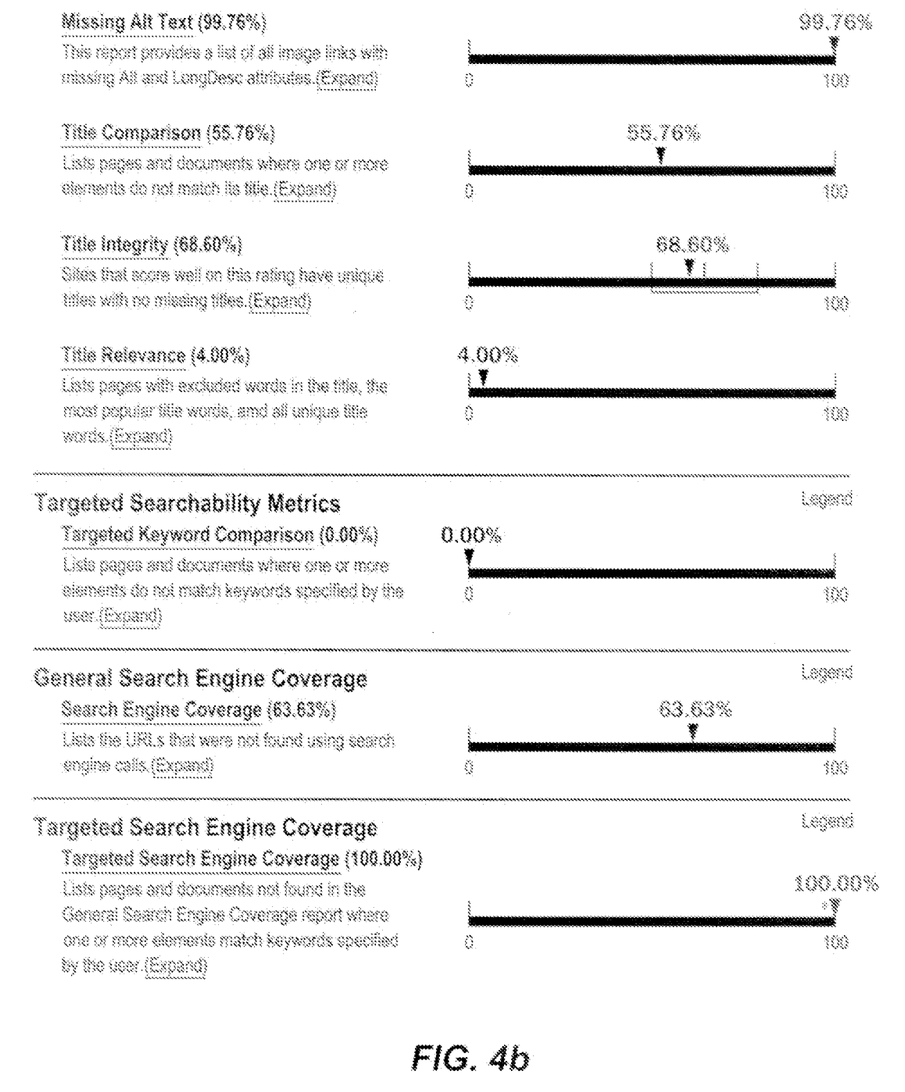

With reference to FIGS. 4a and 4b, a more detailed report directed specifically to Searchability and Search Engine Coverage is provided. In this report, greater detail is provided in relation to aspects such as general searchability metrics (eg document properties, HTML structure, In-link Text Analysis etc) and toward the end of the report, General Search Engine Coverage and Targeted Search Engine Coverage results are reported.

Figure 5:
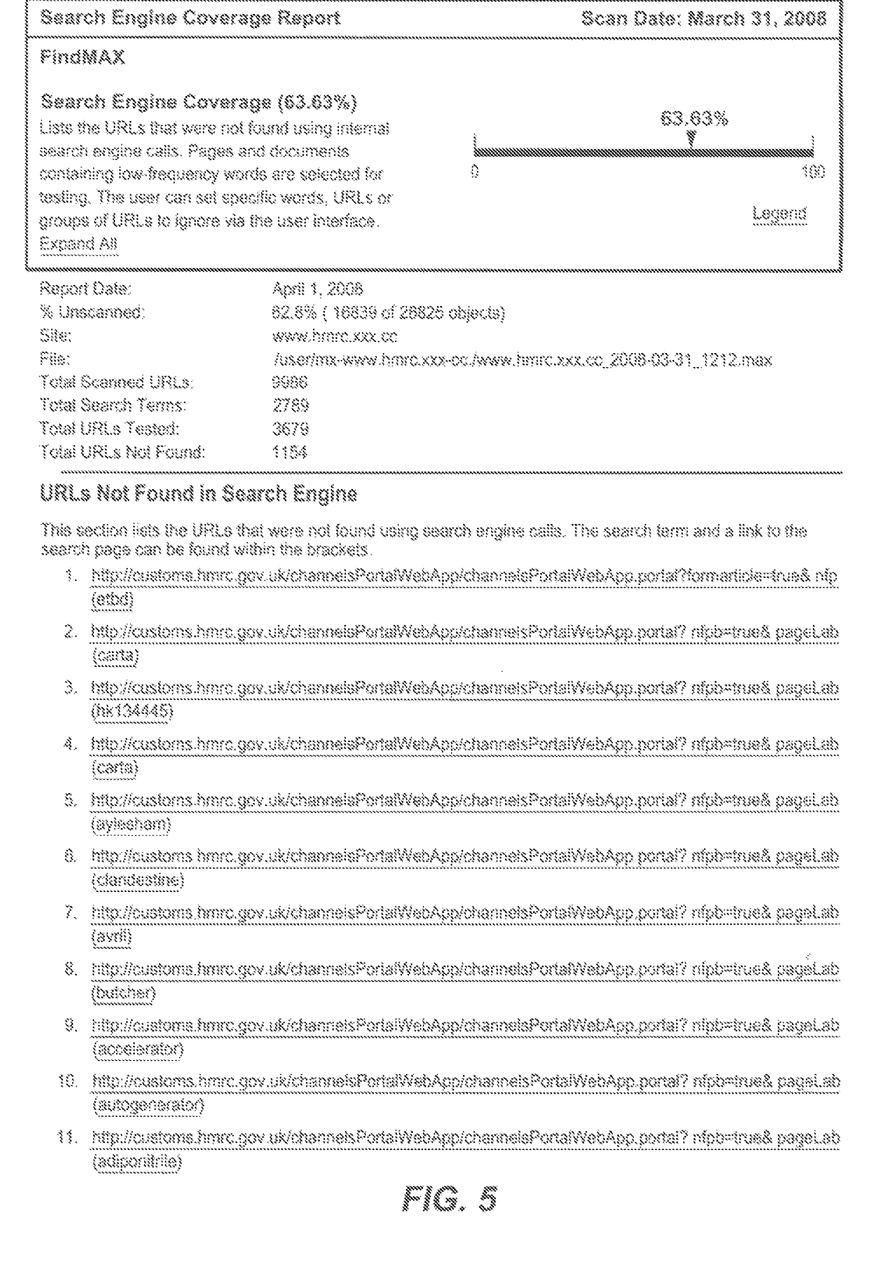
FIG. 5 is a search engine coverage report including a detailed listing of URL's (web-sites) that were not located during the process of validating the search engine.

With reference to FIG. 5, a report with further detail regarding the Search Engine Coverage is provided. In this part of the report, specific details regarding the total number of scanned URLs is provided along with the total number of search terms, the total number of URLs tested and the total number of URLs that were not found. It is from these reported numbers that the overall rating of 63.63% is derived as the measure of search engine coverage. Further, the report includes a detailed listing of the URLs that were not found by the search engine. In the embodiment of the invention that generates this particular report, a link to the URL that was not found is provided thus enabling a viewer to easily select the link and direct their browser to the page containing the missed data.

Figure 6A:
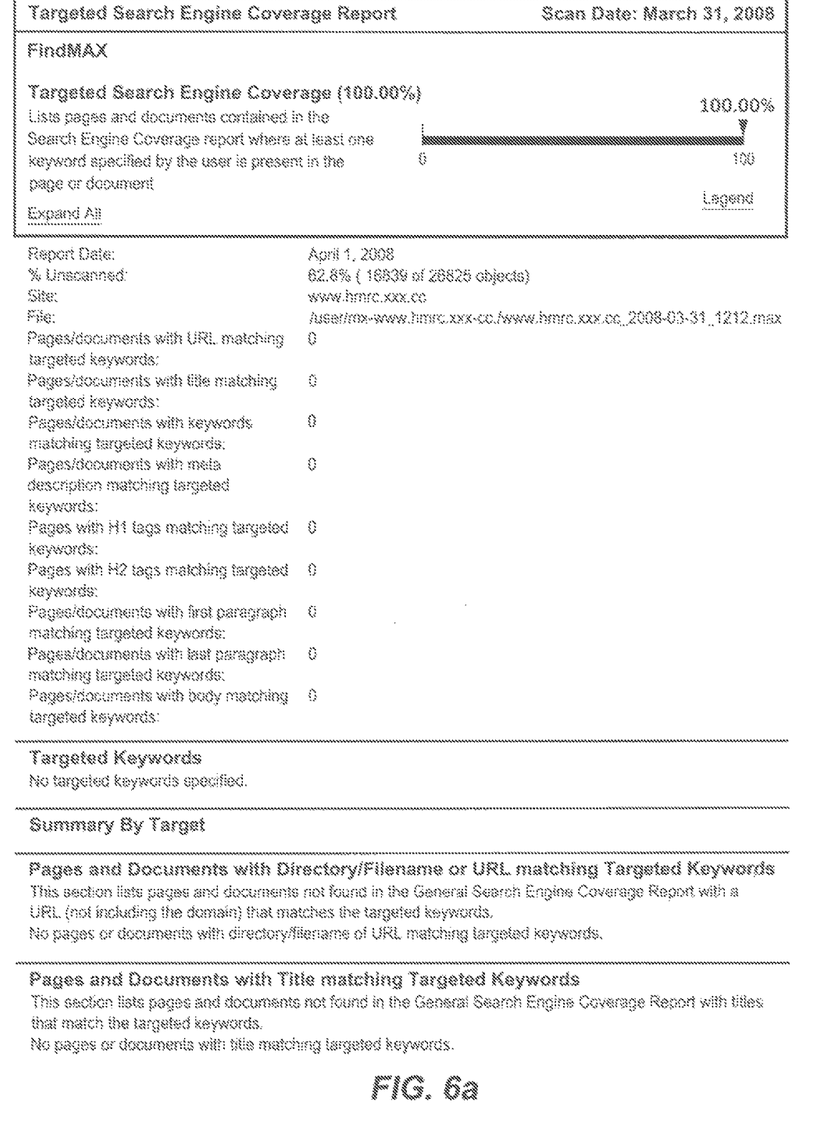

With reference to FIGS. 6a and 6b, a report detailing the results of a Targeted Search Engine Coverage analysis is provided. In the instance of FIGS. 6a and 6b, the report does not provide any actual information.

However, such a report is useful as it allows an organisation to make sure that key pages (with keywords embedded within them) are indexed by their own search engine and therefore accessible to a user via a search query. Organisations generally spend a lot of money on search engine optimisation where they add "keywords" to their web pages to allow the pages to properly identified by the search engine. But, if other errors (such as scripts and broken links etc) result in pages including keywords not being indexed then the investment by the organisation has been wasted. The Targeted Search Engine Coverage identifies these key terms on pages and ensures that they are appropriately indexed.

In summary, embodiments of the system and method of the present invention reveal the strengths and weaknesses of a web site through online scanning, mapping, searching, reporting and traffic analysis These processes involve:

1. Scanning—the software identifies every object—every page, image, document and link—and creates a time and date stamped record of the site at a given point in time.

2. Reporting—Reports serve both executives accountable for Web properties and publishers responsible for maintaining them.

3. Traffic Analysis—Traffic mapping and reporting provides "last mile" analysis capability, complementing existing statistical traffic analysis products.

4. Search—Search enables site managers and Web analysts to identify, with precision, the existence and location of site objects and characteristics.

5. Mapping—the software produces a map of the site, identifying navigation structure and links to and from every page, image, document and link.

6. Blueprinting—Blueprinting facilitates clear and unambiguous communication between site owners and site publishers and developers.

Of course, web-sites are dynamic and continually changing. Accordingly, it is necessary to regularly conduct an analysis of the web-site in order to monitor the search engine coverage and any corrective action that is necessary to overcome and deficiencies or missed data. The reports from a FindMax process allow search engine operators to tune their search engine. In this regard, the search engine operators may use the reports for the following purposes:

1) PDF's—indicating if the Properties Area is blank or null.
2) Comparing the File Name to retrieved results
3) Comparing the entire URL for retrieved results
4) Scanning the Page Title (with the addition of a user controlled variable determine the number of characters)
5) Scanning the Body Content (with the addition of a user controlled variable determine the number of characters)
6) Including Meta Tags—keywords
7) Matching link titles to page titles
8) Pages with most number of in-links
9) Duplicate titles etc Of course, the invention is not restricted to the exemplary embodiment(s) described and depicted by way of examples, but also includes any technical equivalents and combinations thereof.

Those skilled in the relevant field of technology will appreciate that the invention described herein is susceptible to variations and modifications other than those specifically described. It is understood that the invention includes all such variations and modifications that fall within the spirit and scope of the present invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A method of validating results of a client search engine, the method comprising:
   scanning, by a processor of a server, web pages of a client web-site;
   identifying, from the scanning, data objects including words on the web pages of the client web-site;
   creating, by the processor, an index of the data objects identified in the scanning of the web pages of the client web-site, wherein the index of the data objects includes the web pages of the client web-site associated with the data objects;
   selecting, by the processor, unique words from the index of the data objects by finding words in the index that have a low frequency of occurrence on the web pages compared to other words on the web pages and identifying the low-frequency words as the unique words;
   sending, by the processor, the unique words selected from the index of the data objects to the client search engine, wherein the client search engine inserts the unique words selected from the index of the data objects into a search field of the client search engine, and generates a search result, including web pages of the client web-site, based on the inserted unique words;
   receiving, by the processor, the search result including the web pages located by the client search engine;
   comparing, by the processor, the web pages in the search result located by the client search engine to the web pages of the client web-site recorded in the index of the data objects from which the unique words were selected;
   based on the comparison, identifying web pages of the client web-site recorded in the index that are not located by the client search engine; and
   generating a report containing the web pages of the client web-site that were not located by the client search engine.

2. The method according to claim 1, wherein the data objects further include images and links on the web pages of the client website.

3. The method according to claim 1, wherein the contents of the index are organized in an order according to the uniqueness of the data objects.

4. The method according to claim 3, wherein the uniqueness of the data objects is determined by a density analysis of the data objects.

5. The method according to claim 4, wherein the data objects are words and the density analysis further takes into account proximity to other topics.

6. The method according to claim 1, wherein the unique words executed by the client search engine comprise a set of the identified data objects.

7. The method according to claim 6, comprising:
   determining unique data objects as unique words from the data objects identified from the scanning; and
   submitting the unique words, including the set of the identified data objects, to the client search engine, wherein the set of the identified data objects is the unique data objects.

8. The method according to claim 1, wherein the report includes information to identify specific web site pages that contain missed data.

9. The method according to claim 1, wherein the processor is provided with keywords that are of particular importance to determine whether any web page containing the important keyword is missed by the client search engine.

10. A system for validating results of a client search engine including:
    a processing device; and
    a non-transitory computer readable medium storing computer instruction code executed by the processing device to cause the processing device to:
    scan web pages of a client web-site and identify data objects including words on the web pages of the client web-site;
    create an index of the data objects identified on the web pages of the client web-site;
    select unique words from the index of the data objects by finding words in the index that have a low frequency of appearance on the web pages and identifying the low-frequency words as the unique words;

send the unique words selected from the index of the data objects to the client search engine, wherein the client search engine inserts the unique words selected from the index of the data objects into a search field of the client search engine, and generates a search result, including web pages of the client web-site, based on the inserted unique words;

receive, from the client search engine, the search result including the web pages of the client web-site located by the client search engine;

compare the web pages of the client web-site in the search result located by the client search engine to the web pages of the client web-site recorded in the index of the data objects from which the unique words were selected; and based on the comparison, identify web pages of the client web-site recorded in the index that are not located by the client search engine.

11. The system according to claim 10, wherein the computer instruction code further cause the processing device to generate a report of the web pages of the client web-site that are not located by the client search engine.

12. The system according to claim 11, wherein the report includes a link to a web page identified in the report.

13. A non-transitory computer readable medium storing computer instruction code, that when executed by a processor, cause the processor to:

scan web pages of a client web-site;

identify, from the scanning, data objects including words on the web pages of the client web-site;

create an index of the data objects identified in the web pages of the client web-site, wherein the index of the data objects includes the web pages of the client web-site associated with the data objects;

select unique words from the index of the data objects by finding words in the index that have a low frequency of appearance on the web pages and identifying the low-frequency words as the unique words;

send the unique words selected from the index of the data objects to the client search engine, wherein the client search engine inserts the unique words selected from the index of the data objects into a search field of the client search engine, and generates a search result, including web pages of the client web-site, based on the inserted unique words;

receive the search result including the web pages of the client web-site located by the client search engine;

compare the web pages of the client web-site in the search result located by the client search engine to the web pages recorded in the index of the data objects from which the unique words were selected;

based on the comparison, identify web pages of the client web-site recorded in the index that are not located by the host search engine; and generate a report containing the web pages of the client web-site that are not located by the client search engine based on the comparison.

14. The non-transitory computer readable medium according to claim 13, wherein the computer instruction code causes the processor to analyze the indexed data objects and pass only unique data objects as the unique words to the client search engine.

15. The non-transitory computer readable medium according to claim 14, wherein the computer instruction code causes the processor to determine the unique data objects by further conducting an analysis of the data objects according to relative importance of context.

* * * * *

UNITED STATES PATENT AND TRADEMARK OFFICE
CERTIFICATE OF CORRECTION

PATENT NO. : 10,073,919 B2
APPLICATION NO. : 12/296208
DATED : September 11, 2018
INVENTOR(S) : Stephen Denis Kirkby et al.

It is certified that error appears in the above-identified patent and that said Letters Patent is hereby corrected as shown below:

In the Claims

Column 8, Line 30, Claim 4:
"The method according to claim 4" should be "The method according to claim 3".

Column 8, Line 33, Claim 5:
"The method according to claim 5" should be "The method according to claim 4".

Column 8, Line 39, Claim 7:
"The method according to claim 7" should be "The method according to claim 6".

Column 9, Line 19, Claim 11:
"The system according to claim 11" should be "The system according to claim 10".

Column 9, Line 23, Claim 12:
"The system according to claim 13" should be "The system according to claim 11".

Column 10, Line 24, Claim 14:
"The non-transitory computer readable medium according to claim 15" should be "The non-transitory computer readable medium according to claim 13"

Column 10, Line 29, Claim 15:
"The non-transitory computer readable medium according to claim 17" should be "The non-transitory computer readable medium according to claim 14".

Signed and Sealed this
Fourth Day of December, 2018

Andrei Iancu
*Director of the United States Patent and Trademark Office*